United States Patent [19]

Lisnow

[11] 4,162,716
[45] Jul. 31, 1979

[54] FORCED ENGINE DISABLEMENT SYSTEM

[76] Inventor: Howard D. Lisnow, 2765 Carson St., Torrance, Calif. 90503

[21] Appl. No.: 879,095

[22] Filed: Feb. 21, 1978

[51] Int. Cl.² .............................................. B60R 25/04
[52] U.S. Cl. .................................... 180/287; 137/571
[58] Field of Search ......................... 180/103 BF, 114; 70/243; 123/198 DB; 137/552.5, 351, 383, 568, 571, 572

[56] References Cited

U.S. PATENT DOCUMENTS

| | | | |
|---|---|---|---|
| 1,853,950 | 4/1932 | Wing | 180/103 BF |
| 2,695,685 | 11/1954 | Jamison | 180/114 X |
| 3,182,709 | 5/1965 | Fisher | 137/383 |
| 3,653,457 | 4/1972 | Lopen | 180/114 |
| 3,681,544 | 8/1972 | Etheridge | 70/243 |
| 3,687,216 | 8/1972 | Tracy | 180/114 |
| 3,907,060 | 9/1975 | Blurton | 180/114 |
| 3,968,666 | 7/1976 | MacKinnon | 70/243 |
| 3,994,356 | 11/1976 | Smitley | 180/82 R |

FOREIGN PATENT DOCUMENTS 819643  9/1951  Fed. Rep. of Germany .... 180/103 BF

Primary Examiner—Charles E. Frankfort
Attorney, Agent, or Firm—Singer & Singer

[57] ABSTRACT

A separate reservoir of fuel having sufficient capacity to operate a vehicle for approximately ten minutes is inserted in the line between the fuel pump and the carburetor. A normally opened remote controlled valve is inserted between the reservoir and the fuel pump and which is independently operable by the vehicle owner. A vent is located in the uppermost portion of the reservoir and consists of a float type check valve that is closed by the rising level of fluid urged into the reservoir from the fuel pump. Leaving the valve open allows the vehicle to operate in the normal fashion. The operator closes the normally opened remotely located valve when leaving the vehicle or giving the vehicle to a parking attendant who has limited authority to only park and service the vehicle. Unauthorized use of the vehicle converts the pressurized fuel system into a gravity fuel system with the limited fuel flowing from the reservoir into the engine carburetor until the fuel is exhausted, thereby stalling the engine.

8 Claims, 3 Drawing Figures

FORCED ENGINE DISABLEMENT SYSTEM

This invention relates to a device and method for discouraging the theft of vehicles and more particularly to a method and device that will discourage the thief from moving the vehicle beyond a very short distance.

In the art of protecting vehicles from unauthorized use, the police and other pece officers have advised the general public to always lock their vehicles to prevent tampering and theft.

It is well known that the modern thief is well equipped and has modern tools to break into any vehicle, pull out the ignition wires, and hot start the engine.

Unfortunately the processes for jimmying a vehicle door and pulling out the ignition system are well known and other than buying bigger locks and placing armed guards over a vehicle, there are really no other safeguards other than to make entry into the vehicle and starting of the vehicle as difficult as possible so that the thief will be persuaded to visit a vehicle in which the door is either not locked or the keys are left in the ignition.

Many of the prior art anti-theft protection devices fail to recognize the simple fact that the thief will gain access to the vehicle and will cause whatever damage is necessary to gain access to the ignition so as to drive that vehicle away.

Many prior art systems disclose the use of heavily armored cable for holding the ignition switch or even the use of dual ignition switches that require a plurality of keys to safely operate the vehicle.

In the prior art, U.S. Pat. No. 3,968,666 issued to Robert B. MacKinnon discloses the use of a solenoid-operated valve located in the fuel line, which valve is controlled by a separate ignition key. The theory being that operation of the vehicle is impossible without the ignition key being used and the second key being used to operate the solenoid-operated fuel valve.

In U.S. Pat. No. 3,834,484 issued to Arlon G. Sangster, there is disclosed a valve located in the fuel pump line feeding the carburetor, which valve is operated by a predetermined code known only to the operator of the vehicle.

U.S. Pat. No. 3,750,430 issued to Anthony Crisa, describes still another ignition switch combined with a fuel valve cutoff thereby allowing the operator to independently shut off the fuel independent of the ignition.

These prior art devices of which the above is only a small sample, all suffer from the same basic defect, which is that the thief is immediately appraised that the particular vehicle contains extraordinary anti-theft protection and hence the thief will use those forces necessary to disable the protection mechanism and without care or regard for the vehicle itself.

In the present invention the inventive concept is concerned primarily with not alerting the thief that this particular vehicle has an anti-theft safeguard constructed as part of the vehicle system. There is provided a separate reservoir adapted to hold a limited quantity of fuel sufficient to run the engine at normal speeds for approximately ten to twelve minutes.

The reservoir is located in the fuel line from the fuel pump feeding the carburetor. A vent is located in the uppermost portion of the reservoir and is constructed in the form of a float type check valve in which the fluid level in the reservoir closes the check valve, thereby pressurizing the reservoir.

A solenoid-operated valve adapted to be controlled from a remote location and preferably by a hidden switch is located in the fuel line between the reservoir and the fuel pump.

In the preferred embodiment the operating switch is normally closed and the solenoid energized to maintain the valve in the normally opened position. In this fashion the fuel pump feeds fuel into the reservoir which is filled and pressurized and which in turn feeds the carburetor in the normal manner. In this configuration the car is operated normally.

Depending on the needs of the vehicle owner, the car will either be placed in a garage for the evening or parked in the street, or possibly given to a parking attendant at a restaurant or other person who is authorized to park the vehicle. In these situations the vehicle owner simply opens the hidden switch thereby de-energizing the solenoid which has the effect of closing the normally opened valve.

In this configuration the fuel from the fuel pump into the reservoir is interrupted and only the fuel in the reservoir is available for further operation of the engine. The parking attendant for example will be able to drive the car, park it, start it and stop it, and return the car to its owner when required. The size of the reservoir is selected to provide approximately ten to twelve minutes of driving time at normal cruising speed.

Should the car be driven beyond that length of time, the fuel from the reservoir will be exhausted and the vehicle will stall, thereby stopping the vehicle and causing the unauthorized user a certain amount of displeasure and annoyance that should result in his abandoning the vehicle for other more convenient transportation.

The concept behind the present invention is not to alert the thief that the car is otherwise protected, which will simply put him on his guard thereby causing him to do other kinds of damage or to spend more time in reviewing the vehicle in the privacy of a garage or parking lot. Being able to start the car and move the vehicle even a short distance will disarm the thief into thinking he has an operating vehicle that is unprotected and once committed, the resulting stalling of the vehicle which will invariably occur at an inopportune moment should cause him sufficient problem for him to abandon the vehicle for other transportation.

Further objects and advantages of the present invention will be made apparent by referring now to the accompanying drawings wherein.

Figure 1:
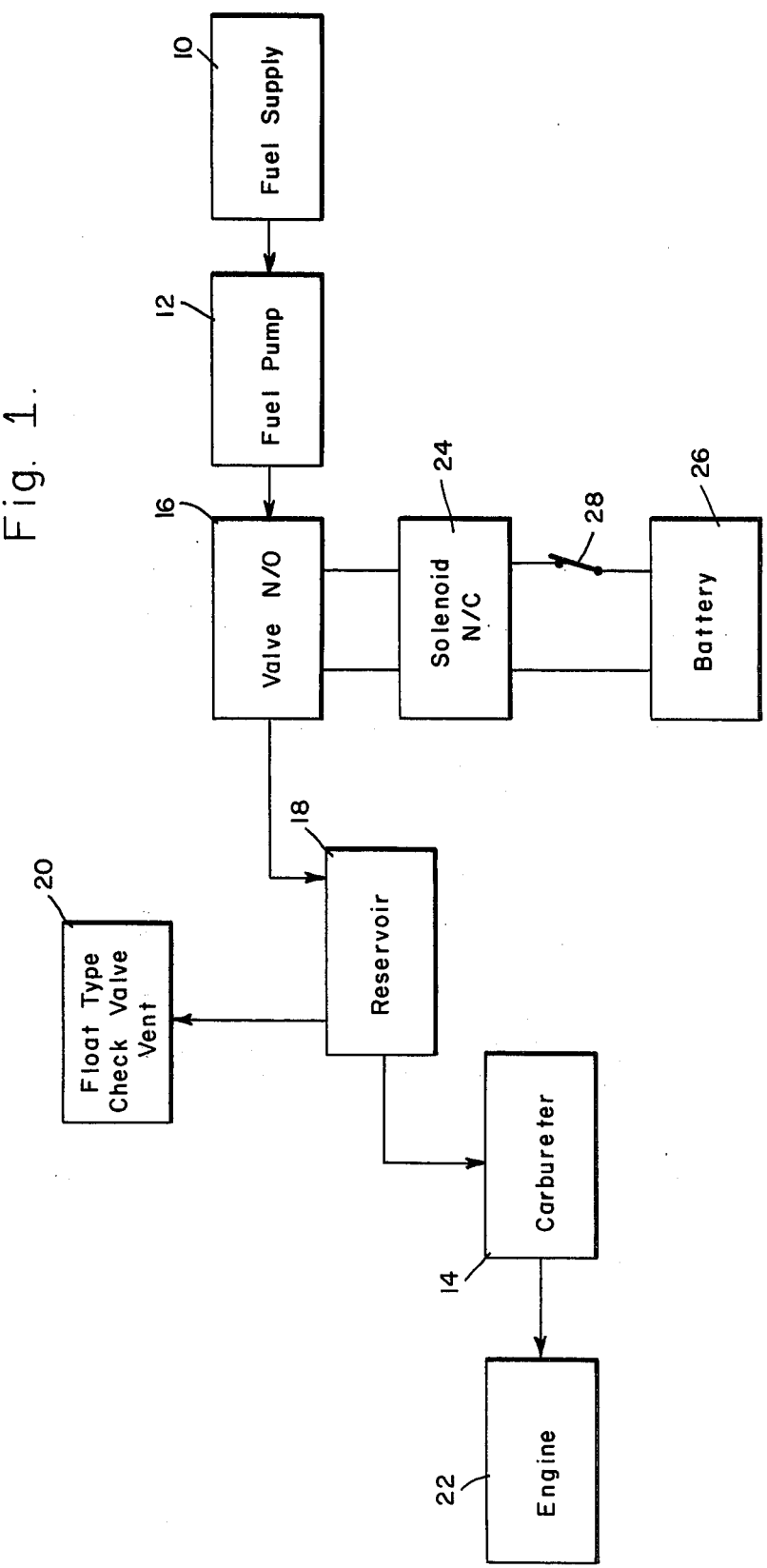
FIG. 1 is a block diagram illustrating the fuel management of the present invention.

Referring now to FIG. 1, there is shown a block diagram of a typical vehicle containing this invention.

A typical vehicle will contain a fuel supply 10 in the form of a tank or tanks for holding fuel. A fuel pump 12 is usually an engine driven pump used to draw fuel from the fuel supply 10 and deliver it to a carburetor 14.

In the present invention a normally opened valve 16 is located in the line from the fuel pump 12 and which in turn feeds a reservoir 18.

The reservoir 18 is preferably constructed in the form of a sealed container adapted to receive the output of fuel from valve 16 and feed the carburetor 14 from the lowermost portion of the reservoir.

Located in the uppermost portion of the reservoir 18 is a vent consisting of a float type check valve 20 that is caused to close as the reservoir 18 fills with fuel. The carburetor 14 feeds an engine 22 in the normal manner.

In the preferred embodiment a normally closed solenoid 24 is connected to the normally opened valve 16. The solenoid 24 is in turn connected in circuit with the vehicle's battery 26 and is controlled by a normally closed switch 28.

FIG. 1 as illustrated shows the protection device in operation with the vehicle being used in the conventional manner, that is, being operated by the owner or one authorized by the owner having unlimited rights to drive the vehicle.

The fuel from the fuel supply 10 is pumped by the fuel pump 12 through the valve 16 which is normally opened into the reservoir 18. The reservoir 18 will fill with fuel and will be pressurized by the fuel pump 12 since the float type check valve 20 will seal the vent thereby allowing fuel under pressure to feed the carburetor 14 which in turn operates the engine 22. This procedure will continue until the operator opens the switch 28.

The protection device is obtained whenever the operator opens switch 28. The device is also fail-proof since failure of the battery 26 will have the same effect as opening switch 28 which is to de-energize the normally closed solenoid 24 which will have the effect of closing valve 16.

Closing valve 16 has the obvious effect of interrupting the fuel flowing from the fuel supply 10 under pressure of the fuel pump 12.

The unobvious effect of closing valve 16 is that the reservoir 18 stays pressurized until the engine 22 is started or, if running, will continue to supply fuel from the reservoir through the carburetor 14 to the engine. As the fuel in the reservoir 18 is used, the fuel level will be lowered and the float type check valve 20 will open thereby immediately converting the fuel in the reservoir 18 into a gravity feed system until of course the fuel in the reservoir is exhausted.

The gravity feed concept of the reservoir 18 is achieved because the reservoir 18 is always located above the carburetor 14 thereby allowing fuel from the reservoir to flow into the carburetor 14 whenever the vent in the reservoir is opened by the float type check valve 20 being allowed to open. In this fashion air will enter the vent and allow fuel from the reservoir 18 to flow into the carburetor 14 until the fuel is exhausted.

In the preferred embodiment the size of the reservoir 18 has been selected to allow for the engine to be driven for approximately ten to twelve minutes before exhaustion.

The reservoir 18 is converted from a pressurized system to a gravity feed system by the operation of the engine 22 which allows the fuel level in the reservoir to drop thereby opening the float type check valve 20 and allowing the reservoir to properly vent.

The size of the reservoir 18 will be a function of the size of the engine and the desire of the vehicle owner.

The system is a fail-safe system since either the failure of battery 26 or the opening of switch 28 will cause the valve 16 to close.

The switch 28 is preferably located in a position known only by the operator. The switch 28 may be located on the fire wall and operated by a tamper-proof key switch or alternately the switch may be located under the rug and operated by a push-button switch similar to a dimmer switch now located on present-day vehicles.

It is contemplated that any of the many well-known tamper-proof lock switches or digital control keys may be used to operate switch 28.

Figure 2:
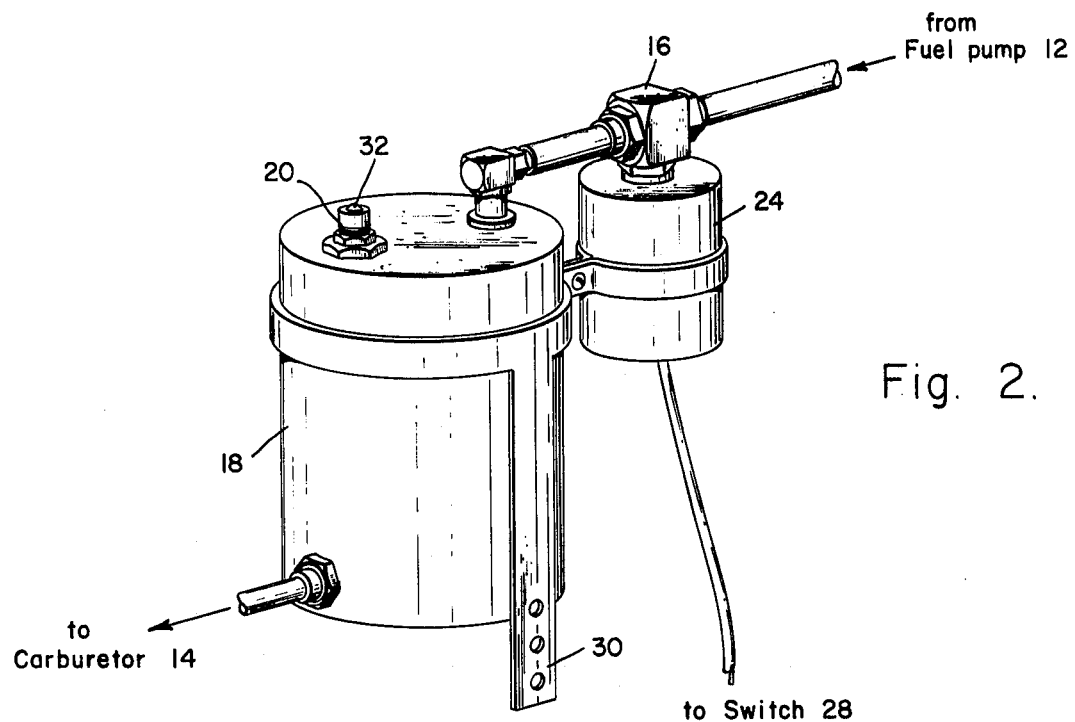
FIG. 2 is a perspective view of the essential elements to be added to a vehicle.
Figure 3:
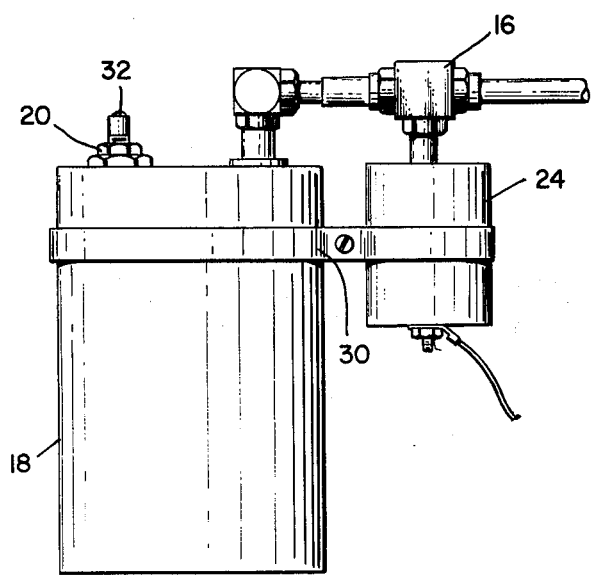
FIG. 3 is a side view of the invention illustrated in FIG. 2.

Referring now to FIGS. 2 and 3, there is shown reservoir 18 supported by a bracket 30 adapted to hold the reservoir above the carburetor 14. Fuel from the fuel pump 12 is fed into a normally opened valve 16 that is controlled by a normally closed solenoid 24 connected by wire to switch 28. The output of the valve 16 feeds the uppermost portion of the reservoir 18 with fuel thereby allowing the reservoir to be pressurized with fuel from the fuel pump 12.

Located in the uppermost portion of the reservoir 18 is a float type check valve 20 having a floating ball 32 that is operated upon by the rising liquid in the reservoir and which is closed when the reservoir is full of fuel.

The output of the reservoir 18 is taken from the lowermost portion and fed to carburetor 14 as shown.

In the practice of the present invention, it is necessary that the reservoir always be located above the carburetor since using the engine and reducing the level of fuel in the reservoir converts the system from a pressurized system to a gravity feed system. The lowered fuel level opens the vent and allows fuel to be drawn from the reservoir. The actual size of the reservoir will vary depending on the size of the engine since it is well known that a larger displacement engine will require more fuel than a smaller displacement engine.

Those skilled in the art will also recognize that the remotely located switch which is normally closed rather than control the solenoid directly may operate through a relay having normally opened and normally closed contacts.

In order to obtain greater security, it is possible to connect a flashing light connector which operates flashing lights on the vehicle in circuit with a relay picked up by the remotely located switch to automatically cause the flashing lights to operate when the engine runs out of fuel as indicated by the low pressure enunciator.

The present invention may be used in combination with other well-known lights, sirens or automatic transmitting devices, which devices will be automatically triggered after the car has been stolen and the vehicle runs out of gas. At that time the theft of the automobile would have been committed and the thief would not be in a position to figure out why but, rather, would have to abandon the vehicle and hopefully in an undamaged condition.

It will be appreciated by those skilled in the art that the system may be placed in operation whether the engine is running or whether the engine is shut down. Complete control of energizing the engine disablement system is always under control of the driver in the vehicle.

I claim:
1. A theft protection device for limiting fuel in a vehicle having a fuel pump, a carburetor and an engine comprising:
 a reservoir located above the carburetor connected in series with the fuel line between the fuel pump and the carburetor and adapted to hold a limited supply of fuel,
 a float type check valve vent located in the uppermost part of said reservoir for sealing said vent in the presence of fuel from the fuel pump filling said reservoir, and a single normally opened controllable valve connected in series with the line between the fuel pump and said reservoir for pressurizing said reservoir with fuel from the fuel pump and feeding said pressurized fuel from said reservoir to said carburetor whereby closing said normally opened controllable valve gravity feeds the engine with said limited fuel from said reservoir by opening said float type check valve vent until the fuel is exhausted and the engine stalls.

2. A theft protection device according to claim 1 in which the rising fuel level in said reservoir closes and seals said float type check valve thereby pressurizing said reservoir by closing said vent whereby said reservoir is pressurized before fuel is fed to said carburetor.

3. A theft protection device according to claim 1 in which the absence of fuel pressure from the fuel pump opens said float type check valve vent and converts said reservoir into a gravity feed system as the engine continues to operate.

4. A theft protection device according to claim 1 which includes a solenoid for opening and closing said normally opened controllable valve and in which said solenoid is remotely controlled.

5. A theft protection device according to claim 4 which includes a separate switch connected in circuit for energizing said solenoid and in which said switch is located in a hidden location in said vehicle.

6. A theft protection device according to claim 5 in which said switch is normally closed and said solenoid energized to hold said valve in an opened position whereby removing electrical power from the vehicle energizes the theft protection device.

7. A theft protection method for limiting fuel in a vehicle having a fuel pump, a carburetor and an engine comprising the steps of:
locating a reservoir having a small amount of fuel above the carburetor in series with the fuel line connecting the fuel pump with the carburetor,
utilizing fuel from the fuel pump to first fill the reservoir under pressure and then allow the fuel under pressure in the reservoir to feed the carburetor, and
then, whenever leaving the vehicle, closing a single normally opened controllable valve connected in the fuel line from the fuel pump feeding the reservoir to thereby gravity feed the engine with the small amount of fuel located in the reservoir resulting in fuel starvation to the engine should the vehicle be driven extensively.

8. A method according to claim 7 in which the normally opened valve is controlled independently of the ignition switch used to operate the vehicle.

* * * * *